United States Patent [19]

Pav et al.

[11] Patent Number: 4,498,383
[45] Date of Patent: Feb. 12, 1985

[54] CALENDAR

[75] Inventors: Josef Pav, Krefeld; Wimmar Schmitz, Kempen; Reinhard Wenzel, Krefeld, all of Fed. Rep. of Germany

[73] Assignee: Kleinewefers GmbH, Krefeld, Fed. Rep. of Germany

[21] Appl. No.: 406,494

[22] Filed: Aug. 9, 1982

[30] Foreign Application Priority Data

Aug. 12, 1981 [DE] Fed. Rep. of Germany ....... 3131799

[51] Int. Cl.³ ............................................... B30B 3/04
[52] U.S. Cl. ............................ 100/162 B; 100/93 RP; 29/116 AD
[58] Field of Search ........... 100/37, 38, 162 B, 93 RP; 29/116 AD, 113 AD

[56] References Cited

U.S. PATENT DOCUMENTS 4,074,624  2/1978  Bjornstad et al. ............. 29/116 AD
4,194,446  3/1980  Palovaara ........................ 100/162 B
4,394,793  7/1983  Pav et al. ...................... 29/116 AD
4,432,277  2/1984  Hartmann .............................. 100/37

Primary Examiner—Peter Feldman
Attorney, Agent, or Firm—Peter K. Kontler

[57] ABSTRACT

A system of rolls for use in a calender, printer or rolling mill has a pair of rolls at least one of which has a hollow cylindrical shell with an elastically deformable liner. The shell surrounds a stationary carrier and confines a row of electromagnetic or hydraulic force applying devices which can be adjusted individually to thereby regulate the pressure between the two rolls and hence the temperature at the exterior of the liner. Such temperature is monitored by one or more sensors, and the signals from such sensors are processed by a computer which regulates an adjusting unit for the force applying devices so that the pattern of temperatures along the external surface of the liner matches an optimum pattern.

31 Claims, 6 Drawing Figures

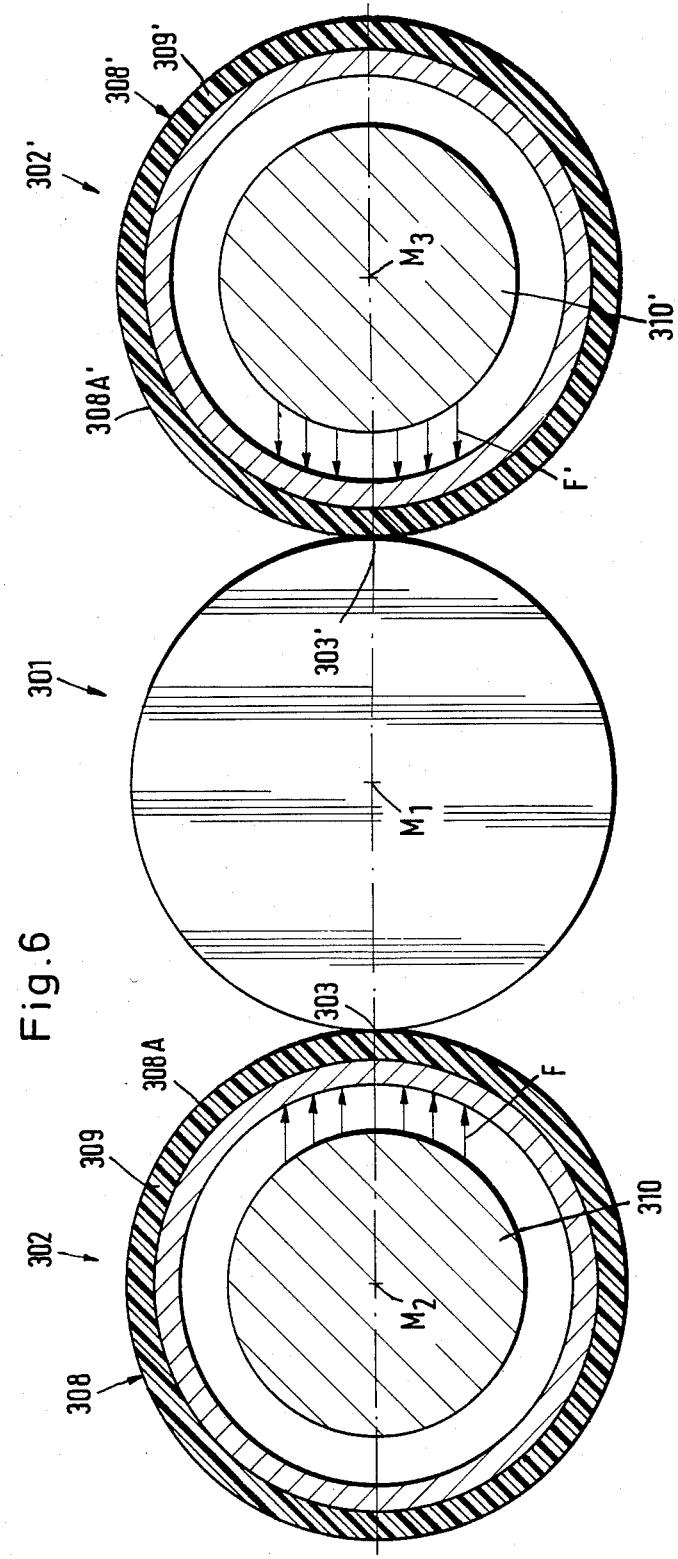

CALENDAR

BACKGROUND OF THE INVENTION

The present invention relates to machines for treating running strips, tapes, webs or sheets of paper, textile, foil and/or analogous material, especially to improvements in systems of rolls which are utilized in calenders, printing plants, rolling mills or like machines or production lines wherein webs, strips, bands or sheets of flexible material are caused to advance along the peripheries and/or through the nips of two or more cooperating rolls. More particularly, the invention relates to improvements in systems of cooperating rolls wherein at least one roll has a shell whose material, at least in the region of the external surface of the shell, is a deformable (e.g., viscoelastic or rubber elastic) substance.

As a rule, the at least partly deformable (elastic) shell of the just discussed roll in a system of cooperating rolls in a calender or a like machine is mounted on and can rotate about a fixed carrier. The shell is propped by an adjusting unit which is installed in its interior and has at least one battery of force applying devices capable of compensating for flexure of corresponding portions of the shell to thus ensure that the width of the nip or nips which is or are defined by the shell with one or more neighboring rolls is at least substantially constant. To this end, the force applying devices are designed to apply to the internal surface of the shell forces of variable magnitude.

German Offenlegungsschrift No. 27 37 346 discloses a system of rolls wherein two rolls having elastically deformable shells are biased against the rigid shell of a third roll which is installed therebetween. The rolls with deformable shells are mirror symmetrical to one another with reference to a plane which includes the axis of the third roll. Each roll with a deformable shell has a plenum chamber which extends along the full length of the third roll and wherein the pressure of a fluid is variable in order to compensate for flexure of the respective deformable shell in a plane including its axis and the axis of the third roll. The plenum chamber is bounded by the shell of the respective roll, by the carrier for such shell, and by two longitudinally extending side walls or cheeks in the interior of the shell. In order to compensate for gravity-induced deformation of their shells, each of the rolls having a deformable shell comprises an elongated shoe which is installed in the respective shell between the carrier and the upper part of the shell and can be biased against the adjacent portion of the internal surface of the shell by a pressurized hydraulic fluid medium. Each shell comprises a rigid hollow cylindrical core and an elastically deformable liner which surrounds the core and whose external surface is adjacent to the external surface of the third roll. The liners consist of a viscoelastic fibrous material, such as paper. It is also known to make the liners from other elastic materials, e.g., from a textile carrier which is impregnated with a synthetic plastic substance, from a cast or extruded synthetic plastic material, or to utilize liners which consist (either entirely or in part) of natural or synthetic rubber.

It has been found that the temperature along the external surface of an elastically deformable shell, as considered in the axial direction of the roll, fluctuates within a rather wide range, for example, between 8 and 80° C. The temperature peaks which develop within such range are likely to adversely affect, and to lead to actual destruction of, the elastic liner. Moreover, the temperature profile which is established in the longitudinal direction of the shell is likely to adversely influence the running webs of paper or other flexible material. Such undesirable influence of a rather wide range of temperatures upon the running web can develop irrespective of whether the deformable roll or rolls are equipped with the aforediscussed or other types of flexure compensating and/or preventing means.

OBJECTS AND SUMMARY OF THE INVENTION

An object of the invention is to provide a system of rolls, especially for use in calenders, printing plants, rolling mills and similar establishments, wherein the deformable portion or portions of the shell or shells of one or more rolls are shielded from excessive (too high or too low) temperatures in a simple and reliable manner.

Another object of the invention is to provide novel and improved means for regulating the temperatures at the external surface of an elastically deformable shell which forms part of a roll in a calender or an analogous machine.

A further object of the invention is to provide a novel and improved method of selecting and maintaining a desirable temperature profile along the external surface of a shell in a roll of the above outlined character.

An additional object of the invention is to reduce the likelihood of damage to the rolls and to running webs, sheets, plates or like materials in a calender or a like machine.

A further object of the invention is to provide a calender or a like machine which embodies the improved roll or rolls.

Another object of the invention is to provide a system of rolls which exhibit the above outlined features and can be utilized in existing machines as a superior substitute for heretofore known rolls or systems of rolls.

An additional object of the invention is to provide the system of rolls with novel and improved means for ascertaining, evaluating and adjusting the temperature of one or more deformable shells.

The invention is embodied in a machine for treating webs or the like, particularly in a calender, a printing plant, a rolling mill or an analogous machine or group of machines. Still more particularly, the invention resides in the provision of a system of rolls which can be used in such machines and comprises a first roll, a second roll including a hollow at least partly elastic rotary shell defining with the first roll an elongated nip, a carrier which is spacedly surrounded by the shell, and supporting means interposed between the shell and the carrier and including a plurality of adjustable force applying devices distributed in the shell in the longitudinal direction of the nip and serving to apply forces to the respective portions of the shell to thereby influence the temperature of such portions. The system further comprises means for ascertaining the temperature of at least some shell portions and for generating signals denoting the ascertained temperatures, means for comparing the signals with reference values denoting the desired or optimum temperatures of the corresponding portions of the shell, and means for adjusting the force applying devices of the supporting means when the ascertained temperatures of the respective portions of the shell deviate from the corresponding reference values. The shell is preferably constructed in such a way that it consists of a viscoelastic or rubber elastic material or that such material is used for the making of a liner which surrounds a more or less rigid hollow cylindrical core of the shell. In other words, at least that portion of the shell which is adjacent to its external surface consists of a deformable material. The carrier is preferably held against rotation in its bearings, i.e., it does not rotate with the shell.

The ascertaining means preferably comprises means for monitoring the temperature of the second roll in the region of the external surface of the shell; such monitoring can take place directly or indirectly. In the first instance, the ascertaining means can comprise a plurality of stationary sensors which are adjacent to selected portions of the external surface of the shell (such sensors are preferably spaced from one another, as considered in the longitudinal direction of the shell) or a single sensor which is reciprocable in parallelism with the axis of the shell, preferably in close or immediate proximity of the external surface of the shell. The means for reciprocating the sensor can comprise a suitable motor, e.g., a rack and pinion drive, a motor which drives a cable to which the mobile sensor is attached or other drive means.

The force applying devices of the supporting means can comprise components (e.g., electromagnets) which consume electrical energy; the adjusting means then comprises means for regulating the supply of energy to the components of the force applying devices in response to signals from the comparing means. Alternatively, the force applying devices can comprise fluid-operated components (such as shoes which are biased against the internal surface of the core by fluid-operated motors, for example, by pairs of hydraulic cylinder and piston units). The adjusting means then comprises means for regulating the pressure of fluid in the components of the force applying devices.

At least some of the force applying devices can comprise pairs of sections which are spaced apart from one another, as considered in the circumferential direction of the shell, and each of which serves to apply to the corresponding portion of the shell a force independently of the other section of the same force applying device. The adjusting means is then designed to adjust the sections of some or all of the force applying devices at least substantially independently of one another so that the force which is applied by one section of a given force applying device need not match the force which is applied by the other section of the same device. This can be accomplished in a relatively simple but efficient way if each force applying device has a shoe whose outer surface is adjacent to the internal surface of the shell and has several pockets in the form of shallow recesses or sockets spaced apart from one another as considered in the circumferential direction of the shell. Each such force applying device further comprises means (e.g., in the form of throttling passages machined into the shoe) for supplying pressurized fluid to the pockets, and the adjusting means then comprises means for regulating the pressure of fluid which is supplied to the pockets of selected devices at least substantially independently of one another so that the pressure in one pocket of a given device can exceed the pressure in the other pocket of the same device. Each such force applying device can further comprise at least two discrete cylinder and piston units which are interposed between the respective shoe and the carrier and which are preferably spaced apart from one another, as considered in the circumferential direction of the shell. The shoes can form a row of closely adjacent shoes, and such row preferably extends in parallelism with the axis of the second roll, i.e., in parallelism with the nip. The end faces of neighboring shoes preferably extend transversely of the axis of the shell and form very narrow clearances, i.e., the neighboring shoes need not touch but can be immediately adjacent to one another.

The shell is preferably shiftable substantially axially with reference to its carrier. To this end, the carrier can be formed with one or more guide faces which extend in parallelism with the axis of the second roll, and the end portions of the shell can contain suitable annular inserts having internal surfaces which engage with and are slidable along the guide faces of the carrier.

The aforementioned comparing means can comprise a computer which evaluates the signals transmitted by the temperature ascertaining means and transmits to the adjusting means second signals when the signals which are furnished by the temperature ascertaining means deviate from the corresponding reference values. The system can comprise means for transmitting to the computer additional signals denoting at least one variable parameter which influences the temperature of the shell (for example, the additional signals can denote the thickness or the mass of the running web which is treated during passage through the nip of the rolls, the temperature of the first roll and/or others). The computer then modifies the signals which are transmitted to the adjusting means so as to account for eventual variations of the aforementioned parameter or parameters. The just discussed computer has a first input which is connected with the temperature ascertaining means, at least one second input for reception of signals denoting variations of one or more parameters, and an output which is connected with the adjusting means. If the shell is subjected to transverse deformation, namely, a deformation at right angles to its axis, the aforementioned signal transmitting means can comprise one or more sensors which detect the extent of transverse deformation of the shell and generate signals which are processed by the computer and transmitted to the adjusting means so that the latter can compensate for transverse deformation, especially if each of the force applying devices comprises two or more independently adjustable sections which are spaced apart from one another, as considered in the circumferential direction of the shell.

The first roll can comprise a second shell which consists, at least in part, of elastically deformable material and comprises adjustable force applying devices which can be controlled in the same way as described above for the second roll. The shells of the two rolls can be identical with one another, and the adjusting means is then arranged to adjust the force applying devices of both rolls, preferably in such a way that the force which is applied by a device of the first roll is identical with but counteracts the force which is applied by the corresponding device of the second roll. The outer diameters of the first and second rolls can be identical.

If the first roll is substantially rigid, the system can comprise a third roll which is identical with or similar to the second roll. The first roll is then disposed between the second and third rolls and the axes of all three rolls are parallel to one another. Such axes can be disposed in a common plane.

The novel features which are considered as characteristic of the invention are set forth in particular in the appended claims. The improved system of rolls itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a diagrammatic end elevational view of the system which is shown in FIG. 1, further showing the forces which develop when the system is in use in a calender or the like;

FIG. 6 is a schematic partly end elevational and partly transverse sectional view of a system of three rolls including a centrally located roll which has a rigid shell and is flanked by two rolls whose shells are deformable.

DESCRIPTION OF THE PREFERRED EMBODIMENTS

Figure 1:
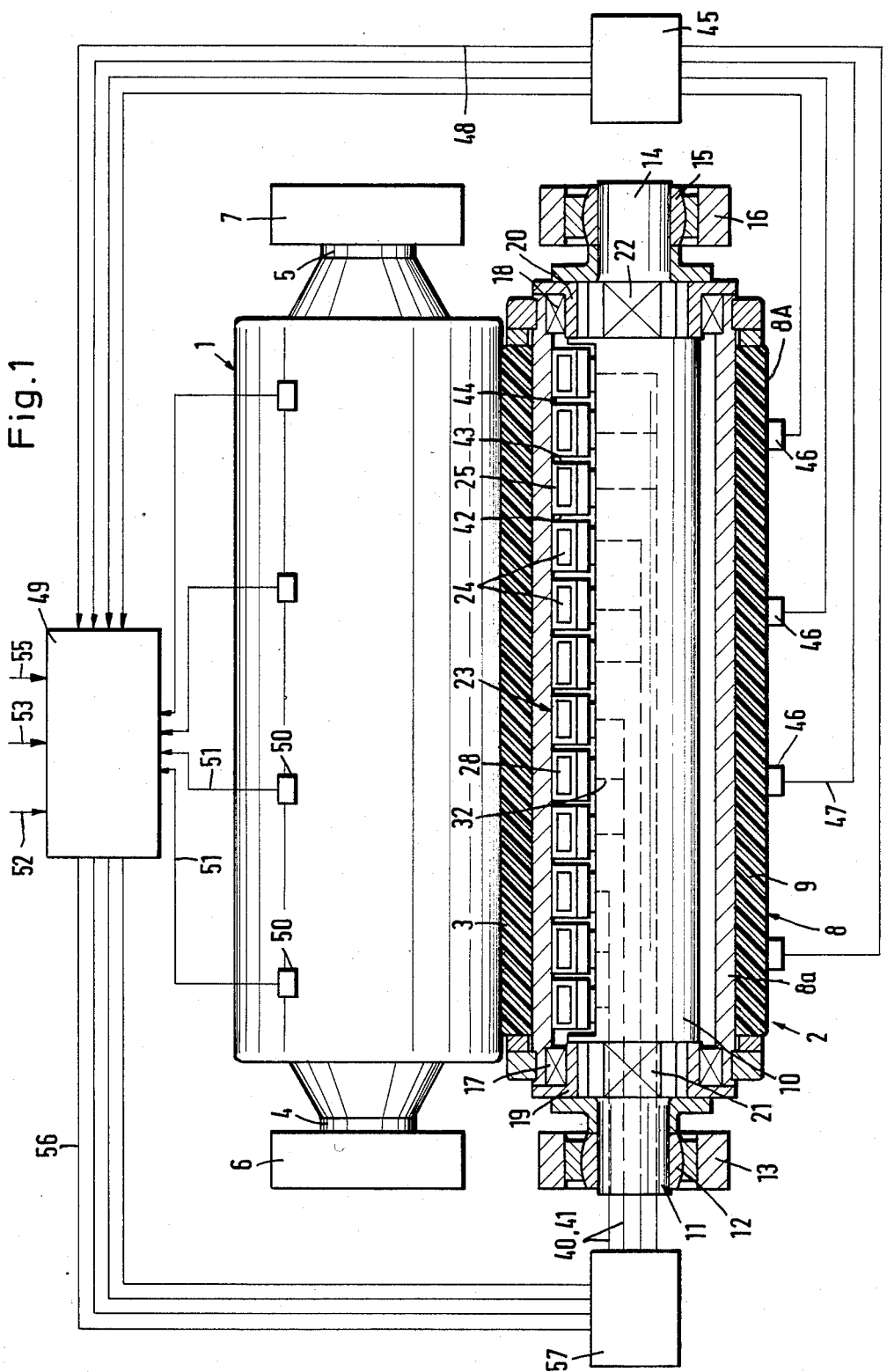
FIG. 1 is a partly diagrammatic partly elevational and partly sectional view of a system of rolls which embodies one form of the invention, one of the rolls having a rigid shell and the other of the rolls being formed with a partly deformable shell.
Figure 2:
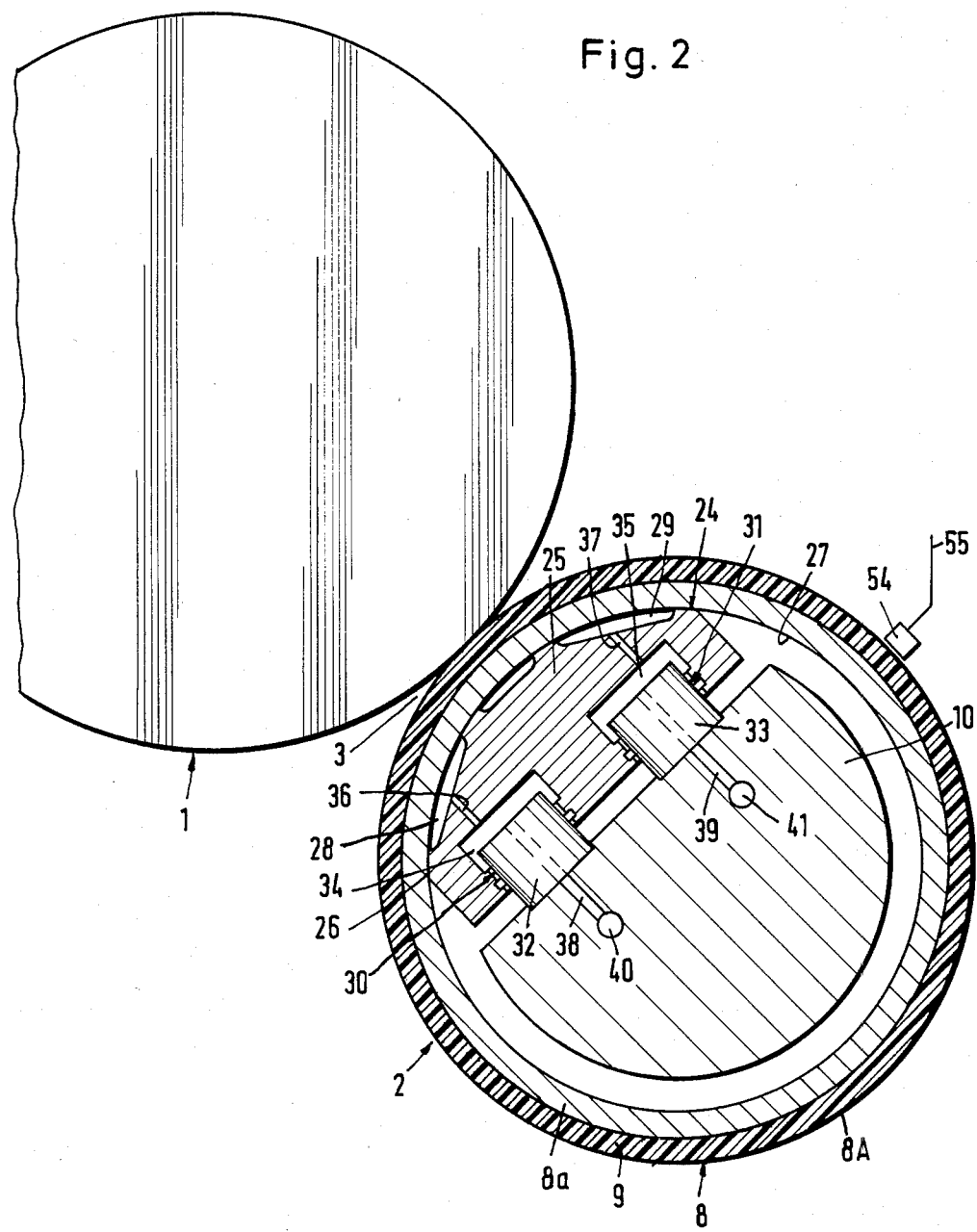
FIG. 2 is a partly diagrammatic in part end elevational and in part transverse sectional view of the system which is shown in FIG. 1.
Figure 3:
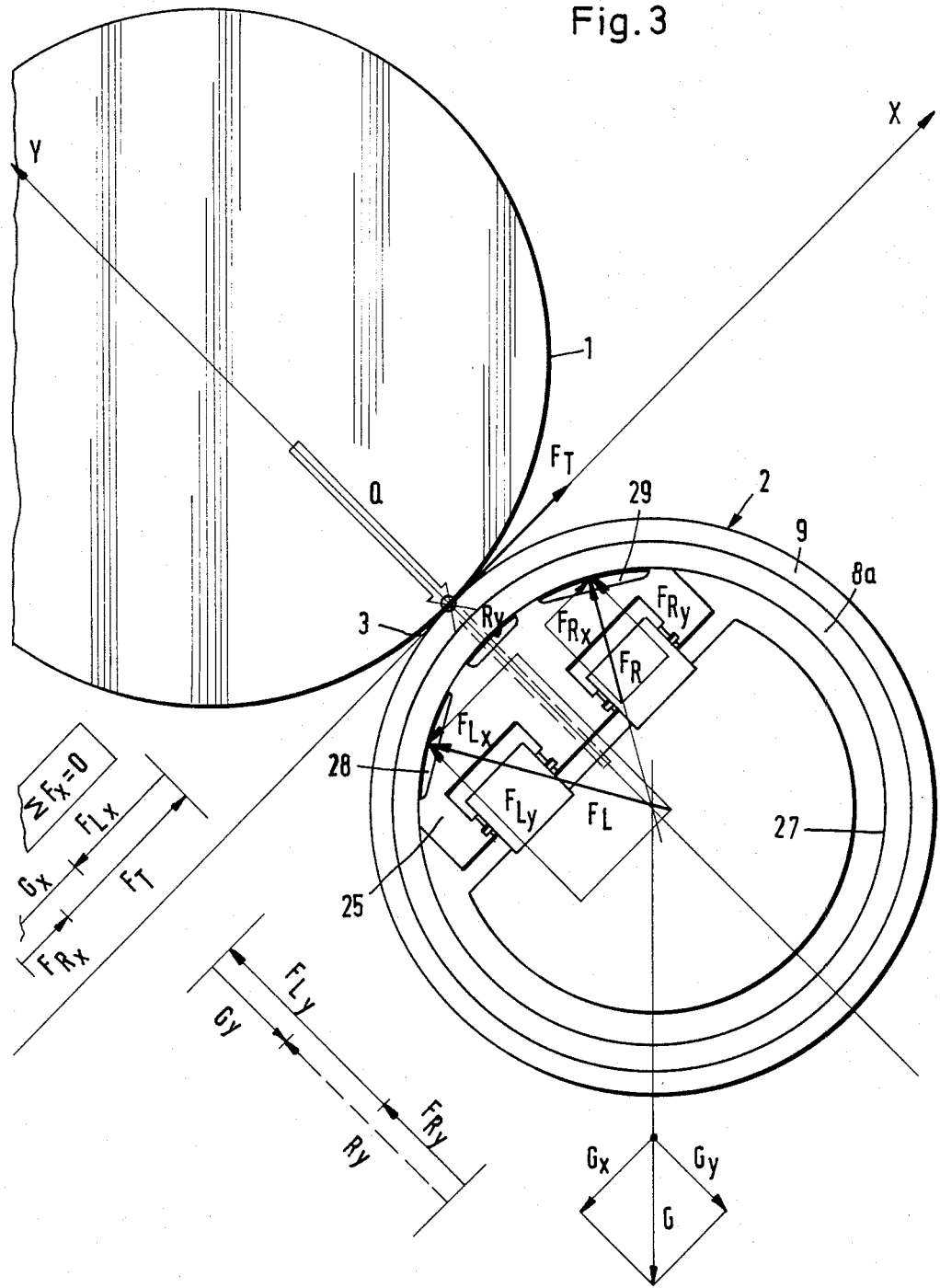

The system which is shown in FIGS. 1 to 3 comprises a rigid roll 1 and a second roll 2 whose axis is parallel to the axis of the roll 1. The rolls 1 and 2 define an elongated nip 3 for the passage of a web of paper or other flexible material to be treated by the rolls. The roll 1 may constitute a casting with a hard shell and has trunnions 4, 5 rotatably mounted in bearings 6, 7 which are installed in the frame or stand of a calender, a printer, a rolling mill or another machine capable of utilizing the improved system of rolls. If the rolls 1 and 2 are installed in a calender, they may be fixedly or shiftably mounted in the stand. Reference may be had to commonly owned U.S. Pat. No. 4,311,091 granted Jan. 19, 1982 to Josef Pav et al.

The roll 2 comprises an elongated hollow cylindrical shell 8 having a substantially rigid hollow cylindrical core 8a and an elastic liner 9 which surrounds the core 8a and whose external surface 8A contacts the external surface of the roll 1 when the nip 3 does not contain a running web of paper or the like. The liner 9 consists of a viscoelastic material which exhibits the characteristics of an elastic as well as those of a viscous substance. For example, the liner 9 can consist of a plurality of layers in the form of compacted sheets or bands made of paper or another fibrous material. It is also possible to employ a liner consisting of several layers of fabric which is impregnated with a synthetic plastic substance, a liner which consists of cast or extruded synthetic plastic material, or a liner made of natural or synthetic rubber.

The shell 8 spacedly surrounds a stationary (non-rotatable) carrier 10 having two end portions 11, 14 which are surrounded by spherical sleeves 12, 15. These sleeves are free to swivel but need not turn in bearings 13, 16 which form part of or are installed in the frame or stand of the machine. The end portions of the shell 8 contain antifriction roller or ball bearings 17, 18 which, in turn, surround inserts or collars 19, 20 surrounding the adjacent portions of the carrier 10. The latter is formed with flat guide faces 21, 22 along which the collars 19, 20 can slide (with the entire shell 8) in the axial and/or radial direction of the roll 2. The guide faces 21, 22 are preferably parallel to the plane which includes the axes of the rolls 1 and 2.

The interior of the core 8a accommodates a supporting unit 23 which includes a row of adjustable force applying devices 24 serving to counteract the flexure of the shell 8 under the action of gravity, under the action of the web which advances through the nip 3 and/or under the action of the companion roll 1. The row of force applying devices 24 extends in parallelism with the axis of the roll 2 and in parallelism with the nip 3.

FIG. 2 shows one of the force applying devices 24. This device comprises a shoe 25 having a convex outer surface 26 which is adjacent to the internal surface 27 of the core 8a and has two shallow recesses or pockets 28, 29 at the opposite sides of the nip 3. These pockets can receive a pressurized hydraulic fluid through discrete throttling passages 36, 37 which are machined into or otherwise formed in the shoe 25 and communicate with the cylinder chambers 34, 35 of two discrete cylinder and piston units 30, 31. The cylinders of the units 30, 31 form part of the shoe 25 and the respective pistons 32, 33 are rigidly connected to or integral with the carrier 10. It will be noted that the cylinder and piston units 30, 31 are staggered with reference to one another, as considered in the circumferential direction of the shell 8. The cylinder chambers 34, 35 respectively receive pressurized hydraulic fluid through discrete channels 38, 39 provided in part in the corresponding pistons 32, 33 and in part in the carrier 10 and communicating with discrete supply channels or bores 40, 41 machined into the carrier 10 and extending in parallelism with the axis of the roll 2. It can be said that each force applying device 24 comprises two discrete sections each of which includes one of the pockets 28, 29 and one of the units 30, 31 and each of which can apply pressure to the corresponding portion of the internal surface 27 independently (or at least substantially independently) of the other section.

As shown in FIG. 1, the shoes 25 of neighboring force applying devices 24 have end faces 42, 43 extending at right angles to the axis of the roll 2, and the end faces 42, 43 of neighboring shoes 25 define relatively narrow or very narrow clearances or gaps 44.

The system of FIGS. 1 to 3 further comprises a unit which serves to ascertain the temperature of various portions of the external surface 8A of the liner 9. This unit includes a temperature monitoring circuit 45 with several discrete fixedly mounted sensors 46 adjacent to the external surface 8A and spaced apart from one another, as considered in the axial direction of the shell 8. The sensors 46 can contact or are immediately adjacent to the external surface 8A. Each sensor 46 is connected with the monitoring circuit 45 by one or more conductors 47, and the output of the circuit 45 is connected with the corresponding input of a signal comparing circuit 49 which preferably constitutes or comprises a commercially available computer. The conductors 48 transmit to the computer 49 signals denoting the actual temperatures of selected portions of the external surface 8A. The number of sensors 46 can match the number of force applying devices 24, and each sensor 46 can be outwardly adjacent to the shoe 25 of the corresponding device 24. The computer 49 has a memory for storage of a set of reference values denoting the desired temperature profile of the surface 8A. When the signals which are transmitted via conductors 48 deviate from the corresponding reference values, the output of the computer 49 transmits signals via conductors 56 to an adjusting unit 57 which is connected with each of the force applying devices 24 by two discrete channels 40, 41 (only two shown in FIG. 1) so that each section of each device 24 can be adjusted independently of the other section.

The computer 49 can receive a set of optimum reference values by way of its input 52.

FIG. 1 further shows additional sensors 50 which are adjacent to the external surface of the roll 1 and are connected to an additional input of the computer 49 by conductors 51. The sensors 50 are designed to monitor the thickness of the running web; such thickness constitutes a parameter which can influence the temperature of the external surface 8A on the liner 9 of the shell 8. The signals which are transmitted by the conductors 51 are evaluated and processed by the computer 49 to influence (if necessary) the signals which the conductors 56 transmit to the adjusting unit 57. The thickness of the running web can influence the temperature of the surface 8A because such parameter influences the pressure upon successive increments of the liner 9 which contact the web in the nip 3.

The computer 49 has a further input 53 for reception of additional signals, e.g., signals denoting the distribution of the mass of the material of the running web and/or the hardness of the roll of convoluted web. Such parameters also influence (or can influence) the temperature of the surface 8A.

The shell 8 is also subject to (or is likely to be subject to) deformation in a direction at right angles to the plane including the axes of the rolls 1 and 2. Such deformation can be caused by the running web while the latter advances through the nip 3 and at right angles to the plane of FIG. 1. Transverse deformation is detected by a monitoring device 54 (e.g., a conventional proximity detector switch shown schematically in FIG. 2) and the corresponding signals are transmitted to a further input of the computer 49 by conductor means 55. The adjusting means 57 can cause the force applying devices 24 to counteract such transverse deformation because the two sections of each device 24 can be adjusted independently of one another. The manner in which a commercially available computer can evaluate data which are transmitted thereto from plural sources and the manner in which the computer generates and transmits appropriate signals is known and need not be described here. If desired, the computer 49 can be set to evaluate only those signals which are transmitted from the monitoring circuit 45, only signals from the sensors 50, only signals from the detector 54, or only signals which are transmitted to its input 53, as long as the signals which are transmitted via conductors 56 are capable of regulating the temperature profile of the surface 8A. The signals which are transmitted via conductors 56 are indicative of deviations of the actual temperature profile from the desired or optimum temperature profile of the surface 8A.

The adjusting unit 57 contains a source of pressurized hydraulic fluid and/or means for regulating the pressure of fluid in the sets of channels 40, 41 so that the pressure of fluid in the sockets 28, 29 and cylinder chambers 34, 35 of each pressure applying device 24 is sufficiently high or sufficiently low to ensure that the temperature of the respective portion of the surface 8A matches the optimum value or reassumes the optimum value.

The core 8a of the shell 8 can be made of a metallic or a synthetic plastic material. It is dimensioned in such a way that it does not undergo plastic deformation under the influence of external forces to which it is subjected during manufacture and/or in actual use but that it can be elastically deformed by the shoes 25 to the extent which is dictated by the intensity and/or other characteristics of the signals transmitted via conductors 56, i.e., that the configuration of the surface 8A is readily changed in order to eliminate deviations of actual temperature of selected portions of the surface 8A from the optimum or desired temperature. In order to ensure the establishment of ideal or nearly ideal rotationally symmetrical conditions, the shell 8 preferably does not employ any auxiliary devices, such as keys, to hold the liner 9 against rotation with reference to the core 8a. The illustrated supporting unit 23 is similar to supporting units which are used in certain conventional systems of rolls to compensate for variations of pressure lengthwise of the nip of two cooperating rolls. Such supporting units are disclosed, for example, in commonly owned U.S. Pat. No. 4,328,744 granted May 11, 1982 to Pav et al. for "Roll for use in calenders or the like" or in commonly owned pending patent application Ser. No. 269,986 filed June 3, 1981 by Josef Pav et al., now U.S. Pat. No. 4,394,793, for "Roll for use in calenders or the like." The disclosures of these commonly owned cases are incorporated herein by reference.

The system of FIGS. 1 to 3 ensures a spatial (i.e., three-dimensional) regulation or deformation of the shell 8 with a view to ensure that the pattern of temperatures of various portions of the surface 8A (as considered in the longitudinal direction of the nip 3) will match a preselected optimum temperature profile which reduces the likelihood of damage to the roll 2 and to the material which is being treated, and which further ensures that the material is treated in an optimum way. Such optimum conditions can be established and maintained for any desired period of time, even if the circumstances under which the roll 2 is used vary drastically, e.g., in response to replacement of the roll 1 with a different roll. The same holds true if the signals which are transmitted from the computer 49 to the adjusting unit 57 denote not only the differences between the actual and desired temperatures of different portions of the surface 8A but also certain other variable parameters which warrant consideration in selection of pressures between various portions of each shoe 25 and the adjacent portions of the shell 8. The pressure between the shoes 25 and the adjacent portions of the shell 8 can be regulated independently of adjustments (if any) of other roll or rolls in the same system, i.e., the pressure between each shoe 25 (as well as between various portions of each shoe) and the adjacent portions of the core 8a can be regulated within the desired range independently of the associated roll 1 and/or one or more additional rolls in the system. The shoes 25 can establish the entire pressure between the rolls 1 and 2 if the bearings 6, 7 and 13, 16 are fixedly mounted in the frame of the machine utilizing the improved system of rolls, i.e., the pressure between the rolls 1 and 2 can be established, While FIG. 1 shows that the sensors 46 are adjacent to the external surface 8A of the liner 9, it is equally possible to indirectly ascertain the temperature of various portions of such external surface. For example, the sensors 46 or other types of temperature measuring elements can be mounted downstream of the nip 3 adjacent to the path of the running web to monitor the temperature of the web at various distances from its marginal portions. Such temperatures are also indicative of temperatures of the corresponding portions of the surface 8A.

The provision of the detecting device 54 which monitors the extent of transverse deformation of the shell 8 is an optional but desirable feature of the improved system. By eliminating or reducing transverse deformation of the shell 8, one ensures that the nip 3 is at least substantially straight. This, in turn, allows for more predictable and simpler distribution of temperatures as considered in the longitudinal direction of the shell 8. In other words, deformation of the liner 9 in the longitudinal direction of the nip 3 is more predictable and less complex if the shell 8 undergoes minimal transverse deformation which latter stems primarily from the application of the force $F_T$, i.e., it is attributable to the fact that the running web tends to shift the shell 8 in the direction of the x-axis, as viewed in FIG. 3.

The provision of a battery or row of shoes 25 which are immediately or closely adjacent to one another ensures that such shoes can be formed with relatively large pockets (28, 29). This, in turn, enables the system to operate with relatively low pressures. The width of clearances 44 between the end faces 42, 43 of neighboring shoes 25 need not exceed 20 percent and can be less than 10 percent of the width of a shoe 25, as considered in the axial direction of the roll 2.

The collars 19 and 20 at the ends of the shell 8 can be moved in the axial direction as well as radially of the carrier 10. This is desirable and advantageous because it renders it possible to regulate the deformation of the liner 9 all the way between the axial ends of the shell 8. The radial and axial movements of the shell 8 relative to the carrier 10 preferably take place in a plane which includes the axes of the rolls 1 and 2.

Figure 4:
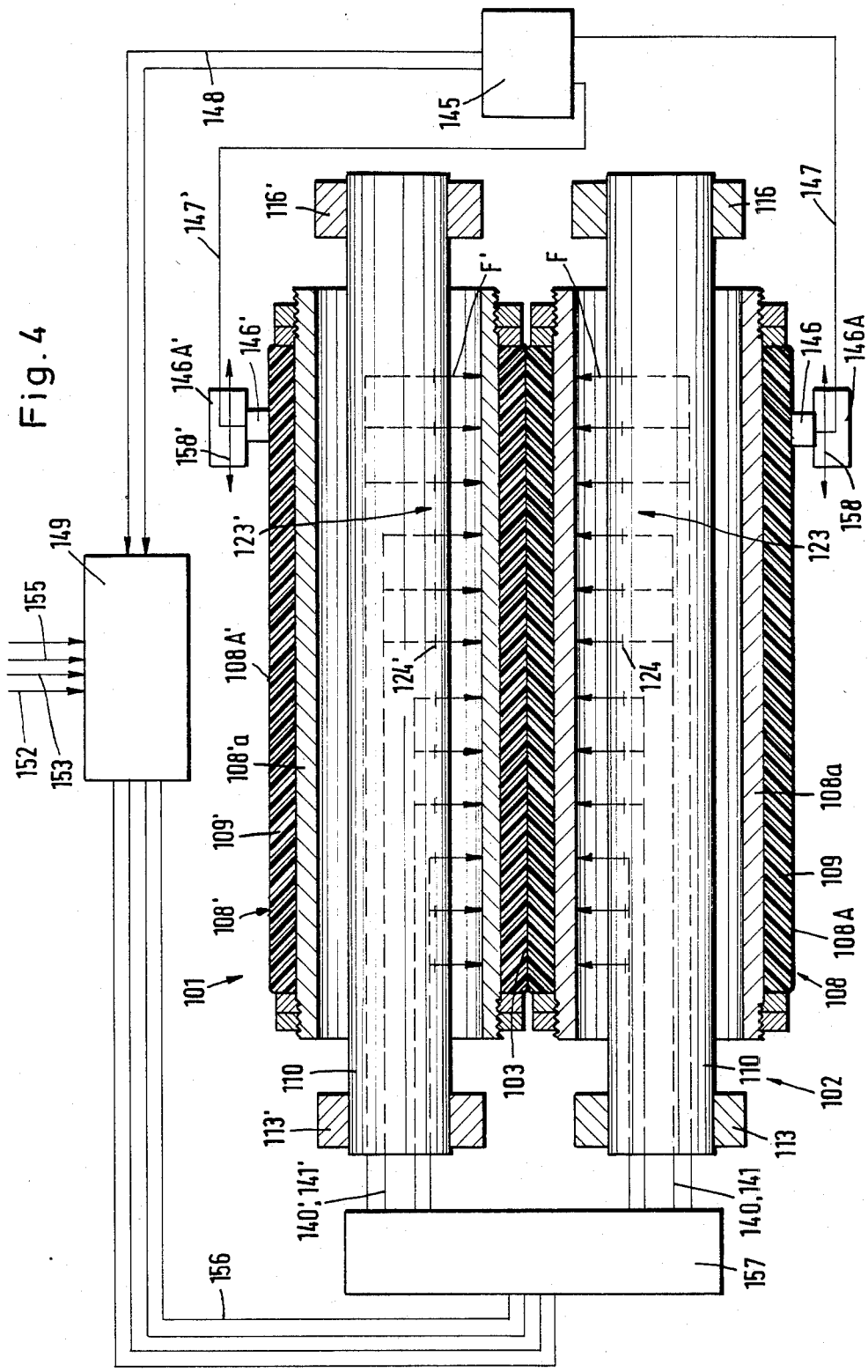
FIG. 4 is a diagrammatic longitudinal sectional view of a modified system employing two substantially identical rolls each of which has a partly deformable shell.

FIG. 4 illustrates a modified system of rolls 101 and 102. The roll 102 is a mirror image of the roll 101 and all of its parts are denoted by reference characters similar to those denoting the parts of the roll 102 but each followed by a prime. Furthermore, all such parts of the roll 102 which are identical with or analogous to the parts of the roll 2 are denoted by similar reference characters plus 100. The supporting units 123 and 123' of the rolls 102 and 101 employ force applying devices 124 and 124' whose components (e.g., electromagnets) consume electrical energy which is supplied by a common adjusting unit 157 via sets of conductors or leads 140, 141 and 140', 141'. The supporting units 123 and 123' are shown only schematically because their construction may be identical to that of supporting units which are disclosed in commonly owned U.S. Pat. No. 4,290,353 granted Sept. 22, 1981 to Josef Pav et al. for "Roll for calenders or the like". The disclosure of this patent is incorporated herein by reference. The supporting units 123, 123' respectively generate bearing forces F and F'. The adjusting unit 157 serves to regulate the supply of energy which is required by the force applying devices 124, 124' of the supporting units 123, 123'. The arrangement may be such that the intensity of exciting current which is supplied to the devices 124 of the unit 123 matches the intensity of current supplied to the neighboring devices 124' of the unit 123'.

The means for ascertaining the temperatures of external surfaces 108A and 108A' of the shells 108 and 108' comprises two mobile sensors 146, 146' which are reciprocable lengthwise of the respective rolls 102, 101 (note the double-headed arrows 158, 158') by suitable motors 146A, 146A' of any known design. For example, each of the motors 146A, 146A' can comprise a rack and pinion drive, and each such motor can move the respective sensor 146, 146' at regular intervals so that the sensors transmit signals (via conductors 147, 147') to the corresponding inputs of the monitoring circuit 145. Such signals denote the actual pattern of temperatures of different portions of the respective external surfaces 108A and 108A'. The liners 109 and 109' are subjected to requisite fulling action to ensure that the temperatures of portions of the surfaces 108A, 108A' are changed if they deviate from the optimum values as set by reference values which are stored in the memory of the computer 149. In all other respects, the operation of the system embodying the rolls 101 and 102 is identical with or analogous to operation of the system which is shown in FIGS. 1 to 3.

An advantage of the system of rolls wherein each of the two cooperating rolls has a viscoelastic or rubber elastic liner is that the temperature of the surface 108A can be regulated simultaneously with regulation of the temperature of the surface 108A'. This, in turn, ensures that the temperatures at both sides of the path for a running web, strip, tape or sheet which advances through the nip 103 can be maintained within an optimum range, i.e., that the material of the web is subjected to an optimal heat treatment during travel between the deformable liners 109 and 109'. The manner in which the devices 124 apply fulling forces to corresponding portions of the liner 109 is the same or analogous to the action of devices 24 upon the neighboring portions of the liner 9 and to the action of devices 124' upon the adjacent portions of the liner 109'. Since the forces F and F' are preferably identical and act in opposite directions, the adjusting unit 157 can be of relatively simple design because the intensity of signal which is transmitted to a device 124 can be identical with that of the signal which is applied to the corresponding device 124', and vice versa. Thus, if the liners 109 and 109' consist of identical materials and exhibit similar characteristics (and if the mounting of the shells 108, 108' is also similar or identical), deformation of the liner 109 preferably matches that of the liner 109' when the system of rolls 101, 102 is in actual use.

The diameter of the surface 108A preferably matches the diameter of the surface 108A' because this ensures that the area of contact between the running web and the roll 101 is the same as that between the web and the roll 102.

Figure 5:
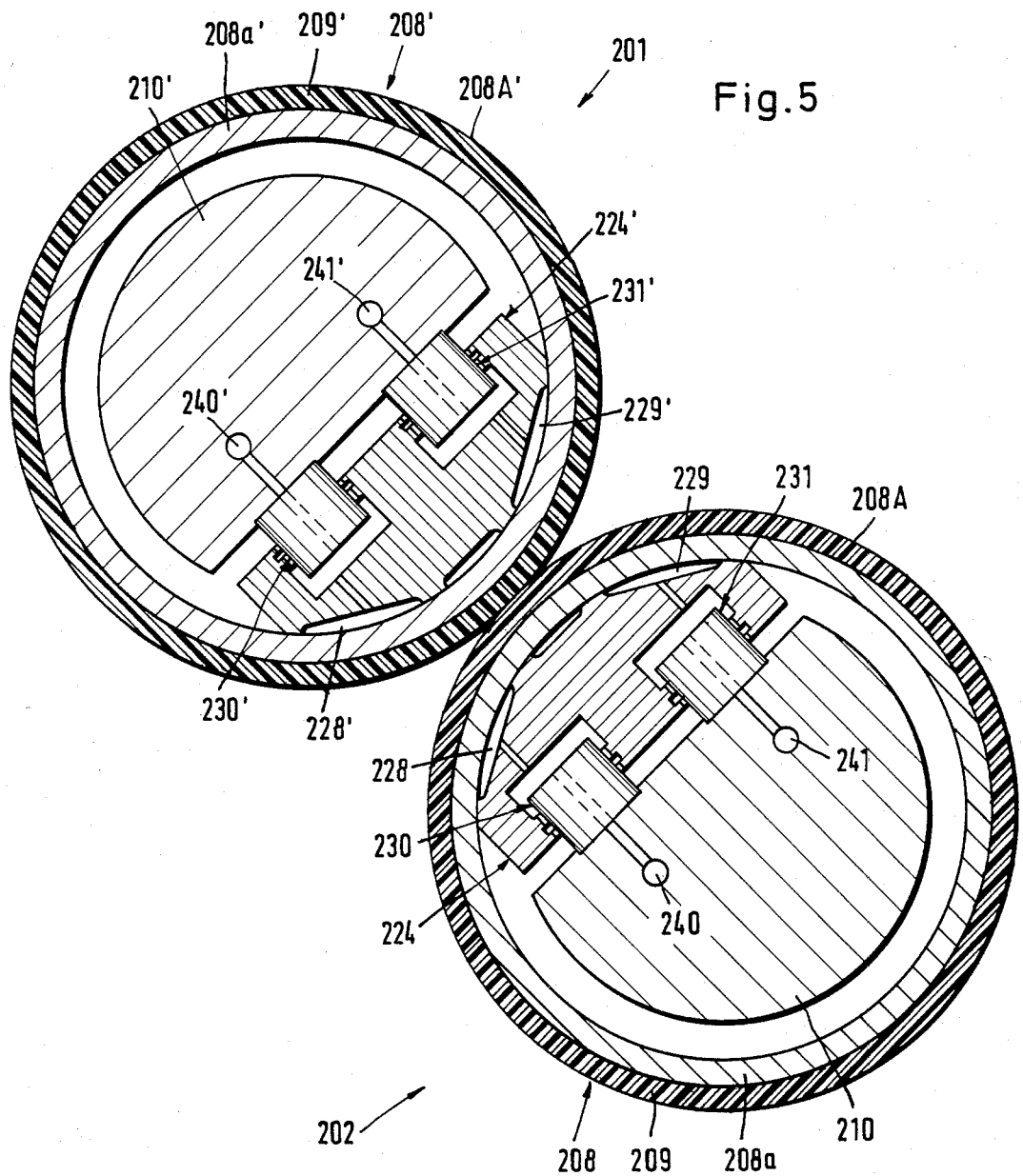
FIG. 5 is a transverse sectional view of a third system of rolls which are constructed, assembled and controlled in accordance with the present invention.

FIG. 5 shows a third system wherein the rolls 201 and 202 are at least substantially identical with the roll 2 of the system shown in FIGS. 1 to 3. All such parts of the roll 202 which are identical with or clearly analogous to the corresponding parts of the roll 2 are denoted by similar reference characters plus 200. The parts of the roll 201 are denoted by reference characters matching those used for the parts of the roll 202 but each followed by a prime. The temperature ascertaining and signal evaluating means can be analogous to those shown in FIG. 4, and the adjusting means for the supporting units of the rolls 201, 202 can constitute a modified version of maintained and varied only by the supporting unit 23 in the shell 8.

FIG. 3 illustrates the forces which develop when the system of FIGS. 1 and 2 is in use. It is assumed (the same as in FIG. 2) that the roll 2 is not installed directly below the roll 1 but rather at the 4½ o'clock position so that the force (G) of gravity does not coincide with the forces (Q and $R_y$) acting at right angles to a plane which is normal to the common plane of the axes of the rolls 1, 2 and extends through the nip 3. The system of coordinates is set up in such a way that the abscissa (x-axis) is normal to the plane including the axes of the two rolls and the ordinate (y-axis) is located in such common plane. The roll 1 should apply to the web portion in the nip 3 a radial force Q which ensures that the temperature of the external surface 8A of the shell 8 matches a desired pattern. The web applies to the shell 8 a tangential force $F_T$ which acts in the direction of the x-axis and develops because the web is assumed to rotate the roll 1 and the shell 8 of the roll 2. The tangential force $F_T$ tends to subject the shell 8 to lateral deformation, i.e., to a deformation in the direction of the x-axis and at right angles to the axis of the roll 2. The pocket 28 of the shoe 25 which is shown in FIG. 3 contains pressurized hydraulic fluid which causes the shoe to apply to the adjacent portion of the internal surface 27 a force $F_L$ having a component $F_{Lx}$ in the direction of the x-axis and a component $F_{Ly}$ in the direction of the y-axis. Analogously, the fluid in the pocket 29 applies to the adjacent portion of the internal surface 27 a force $F_R$ having a component $F_{Rx}$ in the direction of the x-axis and a component $F_{Ry}$ in the direction of the y-axis. The force G denoting the weight of the roll 2 has a component $G_x$ in the direction of the x-axis and a component $G_y$ in the direction of the y-axis. Under optimal circumstances, the sum of all forces and components of forces $F_T$, $F_{Lx}$, $F_{Rx}$ and $G_x$) acting in the direction of the x-axis should equal zero (as shown in the left-hand portion of FIG. 3). This ensures that the shell 8 of the roll 2 does not undergo any transverse deformation (such as is monitored by the detecting device 54 shown in FIG. 2), i.e., that the nip 3 of the rolls 1 and 2 is straight from the one to the other end. Furthermore, the sum of all forces and components of force acting in the direction of the y-axis preferably produces a resultant bearing force $R_y$ (shown for the second time in the lower left-hand portion of FIG. 3) which opposes the force Q and whose magnitude is selected (by the computer 49) in such a way that it ensures the establishment of a desired pattern of temperatures at the surface 8A, as considered in the longitudinal direction of the shell 8. In other words, the liner 9 of the shell 8 is compressed to such an extent that the temperature of each monitored portion of the external surface 8A matches the corresponding preselected value (as furnished to the memory of the computer 49 via input 52).

If desired or necessary, the roll 1 can be equipped with a heating or cooling arrangement to thus ensure that the temperature of the surface 8A can be influenced by additional parameters. The temperature of the external surface of the shell of the roll 1 can be monitored by one or more sensors which transmit corresponding signals to one of the computer inputs so that the computer 49 can take into consideration the temperature of the roll 1 while determining the extent of adjustment of the force applying devices 24 via adjusting unit 57.

The invention is based, at least in part, on the recognition that the viscoelastic or rubber elastic material of the liner 9 undergoes repeated and continuous deformation when the roll 2 is in use. The resulting deformation work is largely converted into heat. However, the deformation is not uniform in the longitudinal direction of the shell 8; it depends on the thickness, mass distribution and moisture content of the processed material, on the magnitude of forces which are applied by the adjacent portions of the companion roll or rolls, on the force which tends to rotate the shell (such force is applied by the running web if the shell 8 is not driven by its own prime mover), on the weight of the shell and on the weight of the trunnions and bearings for the shell. Furthermore, and if the liner 9 is made of a viscoelastic material, the viscosity of such material increases in response to increasing temperature and/or moisture content.

It has been found that, by properly adjusting the force applying devices 24 of the supporting unit 23 as a function of (directly and/or indirectly) monitored temperatures of various portions of the external surface 8A, it is possible to control the deformation of the liner 9 in such a way that the pattern of temperatures of the surface 8A (as considered in the longitudinal direction of the nip 3) follows a set of optimum values. The reference values which are stored in the memory of the computer 49 can be constant for the full length of the liner 9; they can vary in the longitudinal direction of the shell 8; and/or they can vary from time to time in dependency on variations of certain other parameters which are likely to vary as the operation of a calender or an analogous machine progresses. Furthermore, and as already explained above, the computer 49 can be designed to take into consideration one or more additional parameters which directly or indirectly influence the deformation or deformability of the material of the liner 9 and hence the temperature along the external surface 8A. Such additional parameters include various characteristics of the running web or sheet and/or various characteristics of the companion roll or rolls.

The improved system can readily eliminate all such temperature peaks which are likely to adversely influence the condition of the liner 9 and/or of the running web or sheet. For example, the feature that the temperatures in various portions of the liner 9 are caused to match a set of optimum values invariably prevents such overheating of the liner 9 that its material would be likely to be combusted which would necessitate replacement of the entire liner or of the entire shell 8. In other words, the improved system contributes to a much longer useful life of the shell and of its liner. In addition, the improved system of rolls allows for a substantial increase of forces which act in the region of the nip 3 as well as for a substantial increase of peripheral speed of the shell 8 without in any way affecting the service life of the liner 9. This renders it possible to employ the improved system for in-line operation in a production line which employs one or more paper processing machines or the like.

The invention can be embodied with similar advantage in systems of rolls wherein the force applying devices are installed in the interior of a rigid shell. The arrangement which is shown in FIGS. 1 to 3 is preferred because the partly elastic shell 8 can be deformed in response to the application of forces whose magnitude is but a fraction of the magnitude of forces that are required to effect a corresponding deformation of a rigid or practically rigid shell.

the adjusting means 57 shown in FIG. 1. The resultant forces which are generated by the supporting units of the rolls 201, 202 furnish a fulling action which is felt by the liners 209, 209' and ensures that the pattern of temperatures along the external surfaces 208A, 208A' of the shells 208, 208' matches the desired values.

FIG. 6 shows a further system of rolls wherein two rolls 302, 302' having shells 308, 308' with elastically deformable liners 309, 309' cooperate with a rigid roll 301. The axes $M_1$, $M_2$ and $M_3$ of the rolls 301, 302, 302' are located in a common plane. The carriers of the rolls 308, 308' are respectively shown at 310, 310'. Each of the forces F and F' shown in FIG. 6 corresponds to the force $R_r$ of FIG. 3. Thus, the supporting units (not specifically shown) of the rolls 302 and 302' are designed to press the liners 309, 309' against the common rigid roll 301 with forces which ensure that the pattern of temperatures along the external surfaces 308A, 308A' matches the desired or optimum pattern as denoted by the reference values which are stored in the computer (not shown) of the system shown in FIG. 6.

The system of FIG. 6 exhibits the advantage that the treatment of a web in the nip 303 may be different from the treatment in the nip 303'. In other words, a running web can be subjected to two slightly or considerably different treatments in a relatively small area, namely, at the diametrically opposite sides of the rigid roll 301. The roll 301 is preferably equipped with a temperature regulating arrangement of any known design. The placing of axes $M_1$, $M_2$ and $M_3$ into a common plane is desirable because it contributes to simplicity of guide means for the rolls 302 and 302'. Deformation of the rigid roll 301 is normally negligible so that there is no need to provide any compensating means which would counteract deformation of the roll 301.

Several systems of the type shown in FIGS. 1-3, FIG. 4, FIG. 5 or FIG. 6 can be installed in a single calender or another machine next to or above each other so that a web of paper or other material can advance seriatim through two, three or more nips. The arrangement may be such that the running web can be subjected to a different treatment during passage through each of two or more nips.

It is further possible to omit the cores of the shells if the liners are sufficiently strong to be self-supporting. Shells without rigid cores can be used with advantage in systems wherein the elastically deformable portions of, or the entire, shells are subjected to the action of relatively small or moderate forces. If the self-supporting liners are acted upon by electromagnetic force applying devices (such as the devices 124, 124' shown in FIG. 4), the liners must contain magnetizable or current-conducting layers or strips.

The computer 149 could be of the type Hewlett Packard comprising the components HP 9836 A-011 computer, HP 98622 A-003 GP/IO-Interface, HP 98256 A-256 K-Byte memory-board, HP 6942 A multiprogrammer with HP 69751 A A/D converter, HP 69730 A scanner, HP 69720 A D/A converter, HP 69771 A digital-input, HP 69731 A digital-output.

The adjusting unit 57 could be of the type proportional-pressure-reducing-valve DN 6, manufacturer: Herion.

The circuits 45 could be of the type Sensors 45: Gulton infratherm-sensor IN2/3 809 010.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a machine for treating running webs or the like, particularly in a calender for treating sheets of paper and the like, a system comprising a first roll; a second roll including a hollow at least partly elastic rotary shell defining with the first roll an elongated nip, a carrier spacedly surrounded by said shell, and supporting means interposed between said shell and said carrier and including a plurality of adjustable force applying devices distributed in said shell in the longitudinal direction of said nip and arranged to apply forces against the respective portions of said shell to thereby influence the temperature of such portions, each of said rolls having an external surface and at least that portion of one of said rolls which is adjacent to the respective external surface consisting of a viscoelastic material; means for ascertaining the temperatures of at least some of said portions and for generating signals denoting the ascertained temperatures; means for comparing said signals with reference values denoting the desired temperatures of said portions; means for adjusting said force applying devices when the ascertained temperatures of the respective portions of said shell deviate form the corresponding reference values, said comparing means comprising means for evaluating said signals and for transitting to said adjusting means second signals when the signals furnished by said ascertaining means deviate from said reference values; and means for transmitting to said evaluating means additional signals denoting at least one variable parameter of the running web which influences the temperature of said shell, said evaluating means being operative to modify said second signals as a function of the characteristics of such additional signals.

2. The system of claim 1, wherein at least that portion of said shell which is adjacent to the external surface of said second roll consists of a deformable material.

3. The system of claim 2, wherein said deformable material is said viscoelastic material.

4. The system of claim 2, wherein said deformable material is a rubber elastic material.

5. The system of claim 1, further comprising means for holding said carrier against rotation with said shell.

6. The system of claim 1, wherein said ascertaining means includes means for monitoring the temperature of the shell in the region of the external surface of said second roll.

7. The system of claim 1, wherein said ascertaining means comprises a plurality of sensors which are outwardly adjacent said shell.

8. The system of claim 7, wherein said shell is elongated and said sensors are spaced apart from one another, as considered in the longitudinal direction of said shell.

9. The system of claim 1, wherein said ascertaining means comprises at least one sensor which is outwardly adjacent said shell and is movable therealong substantially in the longitudinal direction of said nip.

10. The system of claim 9, further comprising means for reciprocating said sensor in the longitudinal direction of said nip.

11. The system of claim 1, wherein said force applying devices include components which consume electrical energy and said adjusting means includes means for regulating the supply of energy to said components.

12. The system of claim 11, wherein said components include electromagnets.

13. The system of claim 1, wherein said force applying devices include fluid-operated components and said adjusting means includes means for regulating the pressure of fluid in said components.

14. The system of claim 13, wherein said components include hydraulic cylinder and piston units.

15. The system of claim 1, wherein at least some of said force applying devices include pairs of sections spaced apart from one another as considered in the circumferential direction of said shell and each arranged to apply to the corresponding portion of said shell a force independently of the other section, said adjusting means including means for adjusting such sections of the respective force applying devices at least substantially independently of each other so that the force which is applied by one section of a given device need not match the force which is applied by the other section of the same device.

16. The system of claim 1, wherein said shell has an internal surface and each of said force applying devices comprises a shoe having an outer surface adjacent said internal surface and having at least two pockets which are spaced apart from one another, as considered in the circumferential direction of said shell, each of said devices further comprising means for supplying pressurized fluid to said pockets and said adjusting means comprising means for regulating the pressure of fluid which is supplied to the pockets of selected devices at least substantially independently of one another so that the pressure in one pocket of a given device can exceed the pressure in the other pocket of the same device.

17. The system of claim 16, wherein each of said devices further comprises at least two fluid-operated cylinder and piston units interposed between the respective device and said carrier.

18. The system of claim 16, wherein said shoes form a row of closely adjacent shoes and such row extends in substantial parallelism with said nip.

19. The system of claim 18, wherein said shoes have pairs of end faces extending substantially transversely of the axis of said shell and the end faces of neighboring shoes are closely adjacent to one another.

20. The system of claim 1, wherein said shell is shiftable substantially radially with reference to said carrier.

21. The system of claim 20, wherein said carrier has guide faces extending in parallelism with the axis of said shell and said shell has end portions which are guided by said faces.

22. The system of claim 21, wherein said end portions of said shell comprise annular inserts slidably engaging the guide faces of said carrier.

23. The system of claim 1, wherein said evaluating means comprises a computer having at least one first input connected with said ascertaining means, at least one second input connected with said means for transmitting signals, and at least one output connected with said adjusting means.

24. In a machine for treating running webs or the like, particulary in a calender for treating sheets of paper and the like, a system comprising a first roll; a second roll including a hollow at least partly elastic rotary shell defining with the first roll an elongated nip, a carrier spacedly surrounded by said shell, and supporting means interposed between said shell and said carrier and including a plurality of adjustable force applying devices distributed in said shell in the longitudinal direction of said nip and arranged to apply forces against the respective portions of said shell to thereby influence the temperature of such portions, said shell being subject to deformation transversely of said nip; means for ascertaining the temperatures of at least some of said portions and for generating signals denoting the ascertained temperatures; means for comparing said signals with reference signals denoting the desired temperatures of said portions; means for adjusting said force applying devices when the ascertained temperatures of the respective portions of said shell deviate from the corresponding reference values, said comparing means comprising means for evaluating said signals and for transmitting to said adjusting means second signals when the signals furnished by said ascertaining means deviate from said reference values; and means for transmitting to said evaluating means additional signals denoting at least one variable parameter which influences the temperature of said shell, said evaluating means being operative to modify said second signals as a function of the characteristics of such additional signals, said means for transmitting additional signals including means for monitoring the extent of deformation of said shell in a direction transversely of said nip and for transmitting corresponding additional signals to said evaluating means.

25. The system of claim 24, wherein at least some of said force applying devices include pairs of sections spaced apart from one another as considered in the circumferential direction of said shell and each arranged to apply to the corresponding portion of the shell a force independently of the other section, said adjusting means including means for adjusting such sections of the respective force applying devices at least substantially independently of one another so that the force which is applied by one section of a given device need not match the force which is applied by the other section of the same device whereby such sections of the corresponding devices can at least reduce the extent of deformation of the corresponding portions of said shell.

26. The system of claim 25, wherein said evaluating means comprises a computer arranged to determine the necessary adjustment of said force applying devices in response to said signals.

27. The system of claim 1, wherein said first roll comprises a second at least partly elastic hollow rotary shell.

28. The system of claim 27, wherein said first roll is at least substantially identical with said second roll and said adjusting means is arranged to adjust the force applying devices of said rolls so that the force which is applied by a device of said first roll is substantially identical with and opposes the force which is applied by the corresponding device of the second roll.

29. The system of claim 27, wherein the shells of said rolls have identical outer diameters.

30. The system of claim 1, wherein said first roll is at least substantially rigid and further comprising a third roll which is at least substantially identical with said second roll, said first roll being disposed between and being parallel with said second and third rolls.

31. The system of claim 30, wherein the axes of said rolls are disposed in a common plane.

* * * * *

UNITED STATES PATENT AND TRADEMARK OFFICE
CERTIFICATE OF CORRECTION

PATENT NO. : 4,498,383
DATED : February 12, 1985
INVENTOR(S) : Josef PAV et al.

It is certified that error appears in the above-identified patent and that said Letters Patent are hereby corrected as shown below:

On the title page, item, [54] "CALENDAR" should read --CALENDER--.

Column 15, line 62: after "transmitting", --additional-- should be inserted.

Signed and Sealed this

Third Day of September 1985

[SEAL]

Attest:

DONALD J. QUIGG

Attesting Officer     Acting Commissioner of Patents and Trademarks - Designate